Patented Sept. 23, 1952

2,611,747

UNITED STATES PATENT OFFICE 2,611,747

GLASS CLEANING COMPOSITION

Herbert E. Heideman, St. Paul, Minn., assignor to Lan-O-Sheen, Inc., St. Paul, Minn., a corporation of Minnesota No Drawing. Application March 1, 1950, Serial No. 147,138

8 Claims. (Cl. 252—170)

My invention relates to an improvement in glass cleaning composition wherein it is desired to provide a solution capable of cleaning glass without leaving a film thereupon.

During recent years it has become common practice to use solutions for glass cleaning compositions which tend to loosen the dirt and permit it to be easily wiped from the surface of the glass. Most such cleaners include a substance which forms a film on the glass and which remains on the surface of the glass after the dirt has been wiped away. This film is objectionable, particularly during rain storms and the like, as the water does not wet the glass surface in the usual way. Such a film is particularly undesirable for use on automobile windshields and the like, as it makes the glass extremely hard to see through in a rain storm or when the windshield is wet. The film in some instances also tends to collect dust and soot.

The object of the present invention lies in the provision of a liquid for use in cleaning glass surfaces which leaves no remaining film. My composition is so proportioned that it will entirely evaporate from the glass surface, leaving the glass free of film. Thus the difficulties encountered with many types of glass cleaners are eliminated.

A feature of the present invention lies in the provision of a glass cleaning liquid containing naphthalene. This substance is normally a crystalline solid. However, when dissolved in suitable volatile solvents, the naphthalene will entirely disappear as the solvent evaporates, leaving no material on the surface of the glass to attract oil or water.

A feature of the present invention lies in the use in my glass cleaner of a coumarin dye such as beta methyl umbelliferone. This dye has the property of absorbing ultraviolet and reflecting the blue light. A certain amount of this dye remains on the glass surface and acts to reflect light rays, thereby producing a shiny or polished appearance to the glass surface.

These and other objects and novel features of my invention will be more clearly and fully set forth in the following specification and claims.

The present invention lies in the provision of a glass cleaner which includes an alcohol or a ketone which may act as a volatile solvent for naphthalene. The solvent must be capable of carrying the naphthalene from the glass surface as a gas upon evaporization.

Alcohols which have been found most suitable for my purpose include iso or normal propyl alcohol, methyl alcohol, or ethyl alcohol. The ketones which have been found most useful are di-methyl ketone, di-ethyl ketone, or methyl ethyl ketone. Mixtures of the various alcohols and mixtures of the various ketones have also been used with success. Similarly mixtures of the alcohols and ketones also may be used with success.

Naphthalene is ordinarily a crystalline solid having a relatively high boiling point. However, this compound is soluble in volatile organic solvents of the type described. When dissolved in amounts of from .003% to .03% by weight of the solution (including water and alcohol), the volatility of the combination is so complete that no trace of film is left upon the glass. Therefore, it is the purpose of this invention to combine the cleaning qualities of naphthalene with an organic dryer so as to completely volatilize the solution, thereby leaving no film or residue on the glass to attract oil or water.

The solubility of napthalene in alcohol containing solutions is of importance in fixing the limits of the ingredients employed. The alcohol or ketone content may vary somewhat in different territories or in different seasons, more alcohol being desirable in colder weather. The naphthalene content is such that there will be no free solid naphthalene in the solution or on the glass surface, and may vary with the amount of alcohol or ketone used.

The solubility of the umbelliferone is dependent upon the alkalinity of the water as well as the percentage of alcohol. If the solution is neutral or acid, the unbelliferone is substantially insoluble. If the pH of the solution is slightly above neutral, the dye is soluble. The solubility of both the dye and the naphthalene increases with temperature.

I also prefer to employ a coumarin dye in the combination. This dye may be beta methyl umbelliferone, or 2-4 dihydroxy dimethyl coumarin. These dyes have the property of absorbing ultra violet and reflecting blue light thereby providing polished or shiny surface on the glass cleaned. This dye is ordinarily used in a range of from .001 to .01 by weight.

The following formula will show the relative proportions which I prefer to use in my glass cleaning solution:

| | Percent by weight |
|---|---|
| Alcohol or ketone | 11 to 26 |
| Naphthalene | .003 to .03 |
| Coumarin dye | .001 to .01 |
| Water to make 100% | |

As a specific example of my formula, I have found the following composition to work very effectively:

| | Percent |
|---|---|
| Iso propyl alcohol | 15 |
| Naphthalene | .007 |
| Umbelliferone | .002 |
| Water to make 100% | |

In the above formula the various volatile solvents listed could be substituted for the iso propyl alcohol specifically mentioned.

Similarly a different coumarin dye such as 2-4 dihydroxy dimethyl coumarin could be used in place of the one specified. Furthermore, the percentage of solvent may be varied up to 26% and naphthalene content may be varied from .006% to .01% without affecting the composition materially.

As a second example of a specific composition which operates effectively for my purpose, I may cite the use of the following:

| | Percent |
|---|---|
| Di-ethyl ketone | 20 |
| Naphthalene | .01 |
| 2-4 dihydroxy dimethyl coumarin | .002 |
| Water to make 100% | |

In the foregoing formulae, I have disregarded odor modification and coloring. In actual practice I add a small amount of a scenting substance and a small amount of coloring. For example I may use, in percentage by weight, a scenting liquid in a quantity of .0096%, and an azo dye in the amount of .001%. I prefer a red coloring in the solution.

While I am aware that naphthalene has been used for cleaning purposes in various ways, in the present combination one of the great advantages lies in the dissolving of this material in a highly volatile solvent capable of evaporating the naphthalene as a gas. Therefore unless the solvent is contained in proper proportions to accomplish this result, the most desirable results can not be obtained.

In accordance with the patent statutes, I have described the principles of composition and use of my glass cleaning composition, and while I have endeavored to set forth the best embodiment thereof, I desire to have it understood that obvious changes may be made within the scope of the following claims without departing from the spirit of my invention.

I claim:

1. A glass cleaner containing as essential ingredients an aqueous solution of lower alkyl aliphatic alcohol and naphthalene, the naphthalene being present in an amount sufficient to produce a noticeable cleaning effect, but not exceeding .03% by weight.

2. A glass cleaner comprising substantially an aqueous solution including naphthalene in an amount sufficient to produce a visible cleaning effect, but in a quantity of not to exceed .03%, and a volatile solvent for said naphthalene in a quantity of from 11% to 26% by weight, the solvent being selected from the class consisting of lower alkyl aliphatic alcohols and ketones.

3. The composition described in claim 2 and including a coumarin dye in an amount equal to substantially .001% to .01% by weight.

4. A glass cleaning solution including substantially the following ingredients in substantially the proportions named, naphthalene .003% to .03% by weight, a volatile solvent selected from the class consisting of lower alkyl aliphatic alcohols and ketones 11% to 26% by weight, coumarin dye .001% to .01% by weight, water to form 100%.

5. The composition described in claim 4 in which the coumarin dye mentioned comprises beta methyl umbelliferone.

6. A composition described in claim 4 in which the coumarin dye comprises 2-4 dihydroxy coumarin.

7. A glass cleaner including substantially the following ingredients in substantially the percentages listed by weight: naphthalene .003% to .03% a volatile solvent selected from the class consisting of lower alkyl aliphatic alcohols and ketones 11% to 26%, coumarin dye selected from the class consisting of beta methyl umbelliferone and 2-4 dihydroxy coumarin .001% to .01%, and water.

8. A glass cleaner including substantially the following ingredients in substantially the percentages listed by weight: naphthalene .003% to .03%, a volatile solvent selected from the class consisting of lower alkyl aliphatic alcohols and ketones 11% to 26%, and the remainder water.

HERBERT E. HEIDEMAN.

REFERENCES CITED

The following references are of record in the file of this patent:

UNITED STATES PATENTS

| Number | Name | Date |
|---|---|---|
| 871,195 | Toch | Nov. 19, 1907 |
| 1,494,678 | Finnigan | May 20, 1924 |

OTHER REFERENCES

Bennett—Chemical Formulary—Vol. 4 (1939), p. 505.

Gregory—"Condensed Chemical Dictionary"—(1942), p. 451.